United States Patent [19]

Giacometti et al.

[11] Patent Number: 4,534,064
[45] Date of Patent: Aug. 6, 1985

[54] FAULT LOCATION ARRANGEMENT FOR DIGITAL OPTICAL TRANSMISSION SYSTEM

[75] Inventors: Alberto M. Giacometti; George W. Newsome, both of Hilversum, Netherlands

[73] Assignee: U.S. Philips Corporation, New York, N.Y.

[21] Appl. No.: 453,324

[22] Filed: Dec. 27, 1982

[30] Foreign Application Priority Data

Jan. 4, 1982 [NL] Netherlands .................. 8200002

[51] Int. Cl.³ .............................................. H04B 9/00
[52] U.S. Cl. ...................................... 455/601; 455/608
[58] Field of Search .............. 455/601, 608, 9; 370/1, 370/11, 110.4; 375/3, 4; 179/175.3 F

[56] References Cited

U.S. PATENT DOCUMENTS

| | | | |
|---|---|---|---|
| 3,406,343 | 10/1968 | Mehlman | 370/11 |
| 4,257,033 | 3/1981 | Ota et al. | 455/601 |
| 4,406,513 | 9/1983 | Raphael | 455/601 |
| 4,420,842 | 12/1983 | Kuhn | 370/110.4 |

*Primary Examiner*—Joseph A. Orsino, Jr.
*Attorney, Agent, or Firm*—Thomas A. Briody; William J. Streeter

[57] ABSTRACT

A fault location arrangement for a digital optical transmission system employing repeaters (2) has at each repeater an opto-electrical converter (55) and an electro-optical converter (5). The output of the opto-electrical converter (55) is fed via an AGC amplifier (57) and a regenerator (63) to a modulator (200) which comprises a two pole two way switch (40), a single pole two way switch (41) and two current sources (51,52). The two pole switch (40) is controlled by the regenerated data while the single pole switch (41) is controlled by a fault location signal (F2).

The arrangement is such that fault information is transmitted by amplitude modulation of the digital signal but that the average power applied to the electro-optical converter (5) remains constant. Hence the amplitude modulation does not cause a varying dissipation in the converter (5) and hence reduces the possibility of variation of the wavelength emitted by the converter (5).

5 Claims, 8 Drawing Figures

FAULT LOCATION ARRANGEMENT FOR DIGITAL OPTICAL TRANSMISSION SYSTEM

BACKGROUND OF THE INVENTION

The invention relates to a fault location arrangement for a digital optical transmission system, repeaters being provided between two terminal stations in the system in one or in both transmission directions, the output of each repeater being provided with an electro-optical converter coupled to the further optical transmission path, the fault location information between the repeaters and the terminal stations being conveyed by means of amplitude modulation of the optical transmission signal.

It should be noted that a repeater in such an optical system has for its object to receive the attenuated signal coming from the optical fibre, to convert it into an equivalent electric signal, to amplify it, to restore the pulse shape of the digital electric signals, to convert this restored electric signal into an equivalent optical signal, whereafter this restored optical signal is conveyed to the further optical transmission path.

The above-described method of fault location is described in, for example, United Kingdom Patent Specification No. 1,582,726. In said patent specification the fault location signal is superimposed on the digital information signal in the form of modulation of one single optical level. When, however, coherent light sources (lasers) are used in such an optical transmission system this gives rise to problems.

Owing to the amplitude modulation present, the average power dissipated in the light source will be higher in the time intervals in which the luminous flux transmitted by the light source is high than during the time intervals in which the luminous flux transmitted by the light source is low. This results in a variation of the temperature of the light source and consequently also the wavelength of the transmitted light. This effect is described in the Proceedings of the Optical Communication Conference, Sept. 17-19, 1979, Amsterdam, pages 4.2-1 to 4.2-4. Consequently a wavelength modulation of the transmitted light occurs, which modulation depends on the amplitude of the modulating signal. In an optical transmission system this wavelength modulation gives rise to the occurrence of what is commonly referred to as modal noise. Owing to the coherence of the transmitted light and the different delays associated with the mode of propagation, interference phenomena occur which results in an arbitrary fibre cross-section not being uniformly illuminated. Instead spots of light of different intensities occur. In the literature such patterns are known as speckle patterns, for example as described in Proceedings of the Fourth European Conference on Optical Communication Sept. 12-15, 1978, Genova, pages 492-501. The shape of the speckle patterns depends inter alia on the wavelength of the light. Owing to the above-mentioned wavelength modulation movement of the speckle patterns occurs. If there is a non-ideal fibre coupling somewhere in the transmission path, only a portion of the incident light, depending on a speckle pattern, will be coupled into the next fibre. As a result a transmission attenuation occurs which may vary with time, depending on the movement of the speckle pattern. By way of conclusion it may be said that the amplitude modulation of a single optical level causes an unwanted wavelength modulation of the light source which, via wavelength-amplitude conversion, will manifest itself in a parasitic amplitude modulation of the received signal.

SUMMARY OF THE INVENTION

The invention has for its object to provide a fault location arrangement of the type described in the opening paragraph in which the effects of the above mentioned problems is reduced. The invention provides a fault location arrangement as described in the opening paragraph, characterized in that in each repeater the electro-optical converter is coupled to a full-wave amplitude modulator for imposing the said location information on both levels of the digital optical transmission signal.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
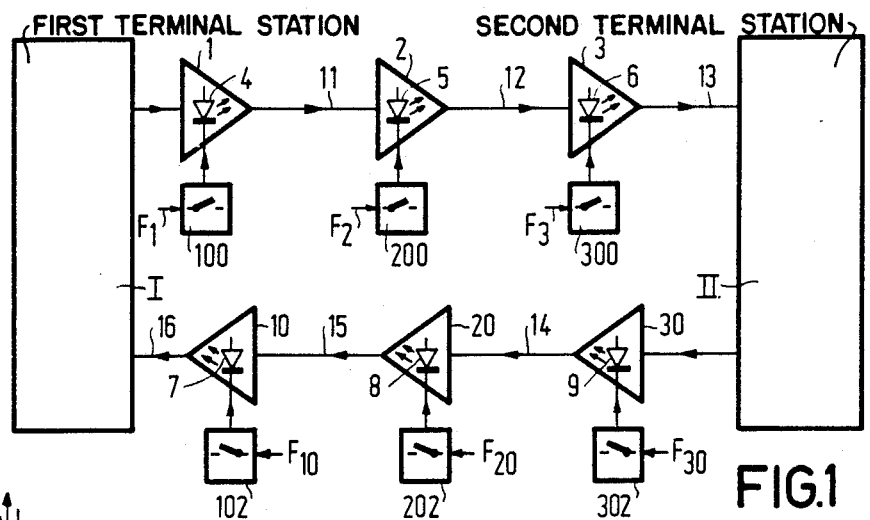
FIG. 1 shows an embodiment of a fault location arrangement in accordance with the invention.

In the embodiment shown in FIG. 1, I is a first terminal station and II a second terminal station. In the forward direction between the two terminal stations I and II the repeaters 1, 2 and 3 are provided. In the return direction between the two terminal stations I and II the repeaters 30, 20 and 10 are provided. The respective repeaters 1, 2 and 3 are provided at their outputs with respective electro-optical converters 4, 5 and 6. The respective repeaters 30, 20 and 10 are provided at their outputs with respective electro-optical converters 9, 8 and 7. Fault location signals F1, F2 and F3 are coupled to the electro-optical converters 4, 5 and 6 of the respective repeaters 1, 2 and 3 via full-wave amplitude modulators 100, 200 and 300. Fault location signals F30, F20 and F10 are coupled to the electro-optical converters 9, 8 and 7 of the respective repeaters 30, 20 and 10. Via full-wave amplitude modulators 302, 202 and 102 the respective fibres 11, 12 and 13 form further transmission paths for the repeaters 1, 2 and 3, respectively. Fibres 14, 15 and 16 form further optical transmission paths for the repeaters 30, 20 and 10, respectively. It should be noted that the manner in which location signals are generated and conveyed will not be further described. The literature discloses many methods therefor. It is, for example, known that after having received a location signal from a preceding repeater, a repeater regenerates this signal and thereafter conveys it to the next repeater. It is also known that after having received a location signal from a preceding repeater a repeater conveys its own location signal to the next repeater.

Figure 2:
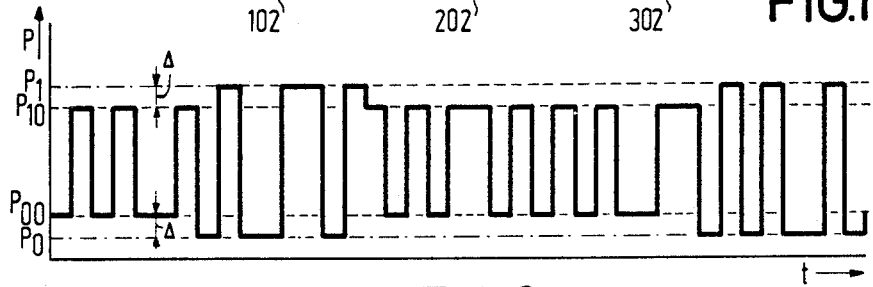
FIG. 2 shows a waveform diagram to explain the operation of the arrangement in accordance with the invention.

FIG. 2 shows the form of the optical signal at the output of a line amplifier after location information has been applied. The logic 1 level of the digital main signal corresponds to the optical power P1 and the logic 0 level of the main signal corresponds to the optical power P0. Both levels P0 and P1 are kept constant in spite of the occurrence of changes in the circuit parameters of the line amplifier in known manner by means of a control loop. The control loop is designed such that it only responds to slow changes in the optical output. The control loop does not respond to fast changes of the optical main signal. The fact that the control loop only responds to slow changes may be utilized to impose the location information on the digital main signal by means of amplitude modulation.

As shown in FIG. 2, the transmission of a logic 1 of the location signal is realized by maintaining the logic 0 and the logic 1 of the main signal on the respective levels P0 and P1. The transmission of a logic 0 of the location signal is realized by maintaining the logic 0 and the logic 1 of the main signal at the respective levels P00 and P10. The levels P00 and P10 are chosen relative to P0 and P1 so that the power dissipated in the light source is independent of the logic level of the fault location signal. The light source may be a laser diode. In that case the dissipated power is substantially proportional to the current through the laser diode. The supplied optical power is also a function of the same current, so that I0, I1, I10 and I00 are the currents producing the respective optical powers P0, P1, P10 and P00. If it is assumed that the optical level "high" (P1 or P10) occurs equally often as the optical level "low" (P0 or P00) then, in the event that a logic 1 of the location signal is conveyed the average power is equal to:

$$\tfrac{1}{2}(I0+I1)\cdot V_d \quad (1)$$

where $V_d$ is the assumed fixed diode voltage. The average dissipated power when a logic 0 of the location signal is conveyed is equal to:

$$\tfrac{1}{2}(I00+I10)\cdot V_d \quad (2)$$

Let it now be assumed that $$I00 - I0 = I1 - I10 = \Delta \quad (3)$$

then the expressions (1) and (2) become equal, as $$\tfrac{1}{2}(I00+I10) = \tfrac{1}{2}(I0+\Delta+I1-\Delta) = \tfrac{1}{2}(I0+I1)$$

Consequently, the average dissipated powers are equal in both cases, so that when a coherent light source is employed in the system the temperature of this light source will remain constant +. Consequently wavelength modulation of the light radiated by the light source does not occur, in spite of the fact that the location information is superimposed as amplitude modulation on the digital main signal.

If the optical levels "high" and "low" do not occur equally often, the expression (1) will change. If the high and low levels, respectively occur with a probability p(h) and p(1) respectively then the expression (1) changes into $$[p(h)\cdot I(1)+p(1)\cdot I(0)]V_d \quad (4)$$

The expression (2) then changes into $$[p(h)\cdot I(10)+p(1)\cdot I(00)]V_d \quad (5)$$

Let it now be assumed that it holds that $$I(00) - I(0) = \frac{p(h)}{p(1)} \cdot (I(1) - I(10)) = \Delta \quad (6)$$

then the expressions (4) and (5) are equal, as $$p(h)\cdot I(10) + p(1)\cdot I(00) = p(h)\left\{I(1) - \frac{p(1)}{p(h)}\Delta\right\} + p(1)\cdot$$

$$(I(0) + \Delta) = p(h)\cdot I(1) + p(1)\cdot I(0)$$

Also in this case the dissipated power is independent of the fault location signal. So no wavelength modulation occurs, in spite of the fact that the location information is imposed as amplitude modulation on the digital main signal.

Figure 3:
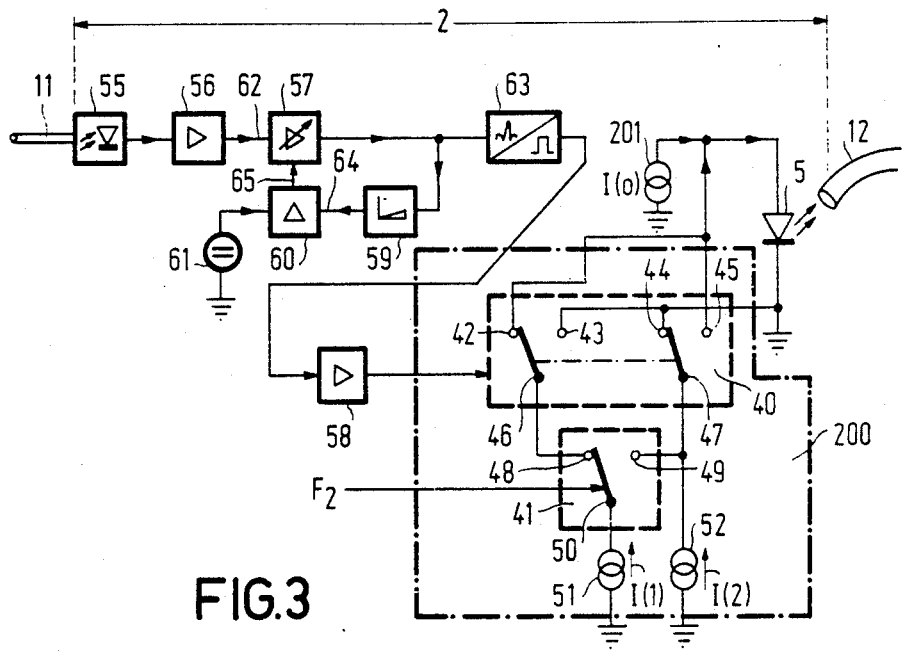
FIG. 3 shows an embodiment of a full-wave amplitude modulator for use in the arrangement of FIG. 1.

FIG. 3 shows the construction of a repeater. A light signal coming from an optical fibre 11 is converted by means of an opto-electric converter 55 into an equivalent electric signal which is applied to a variable-gain amplifier 57 via a pre-amplifier 56. The signal supplied by the variable-gain amplifier 57 is applied to an output amplifier 58 via a regenerator 63. The output signal of the output amplifier 58 is converted into an equivalent optical signal which is applied to the further transmission path 12 via a fault location modulator 200 and the electrooptical converter 5. A control loop comprising a peak-detector 59 and a comparator 60 is arranged between the output of the variable-gain amplifier 57 and a control input thereof. The variable-gain amplifier 57 and the control loop ensure that the peak voltage of the signal at the output of the amplifier 57 remains constant.

Normally, the time constant of the peak detector 59 is chosen such that an amplitude modulation imposed on the main signal is detected up to a modulation frequency of some kHz. This means that actually the peak detector 59 operates as a demodulator for the fault location signal. In contrast therewith, in some cases the control rate of the control loop is high enough to maintain the amplitude of the signal from the output of the variable-gain amplifier 57 substantially constant. To this end, the gain of the variable-gain amplifier will have to change with the inverse of the amplitude of the signal occurring at the signal input 62 of the variable-gain amplifier 57. This means that the variations of the control signal at the control input 65 of the variable-gain amplifier 57 must be in agreement with the fault location signal superimposed on the main signal as an amplitude modulation. Consequently, the fault location signal can be detected at the control input 65 of the variable-gain amplifier 57.

In the embodiment of FIG. 3 it is further shown how a modulator for the fault location signal F2 may be constructed. The modulator comprises a two pole two-position switch 40 and a single two-position switch 41. These switches may be constructed in known manner, for example by means of switching transistors. The first contacts 42 and 45 of the two pole two-position switch 40 are connected to the junction of the electro-optical converter 5 and a current source 201 which produces the biasing current I(0) for the converter. The other terminal of the current source is connected to a point of constant potential.

The second contacts 43 and 44 of the two pole two-position switch 40 are connected to a point of constant potential. The first pole 46 of the switch 40 is connected to the first contact 48 of the switch 41. The second pole 47 of the switch 40 is connected to the second contact 49 of the switch 41 and also, via a current source 52, to a point of constant potential. The pole 50 of the switch 41 is connected to a point of constant potential via a current source 51. The two pole switch 40 is operated by the main signal supplied by the amplifier 58, so that the switch 40 is, for example, in the position shown if the main signal has the "low" level.

Figure 4:
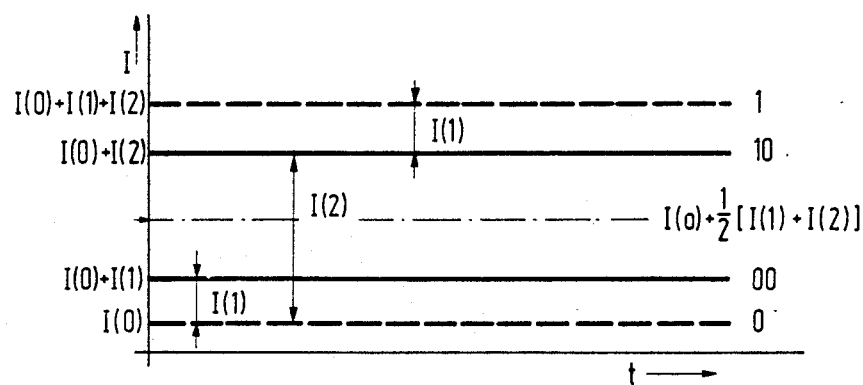
FIG. 4 shows a waveform diagram to explain the operation of the embodiment shown in FIG. 3.

The switch 41 is operated by the fault location signal F2. When the switch 41 is in the position shown, a current equal to I(1)+I(0) or I(0)+I(2), depending on the position of the switch 40, will flow to the converter 5. Consequently the current moves between the levels 00 and 10 of FIG. 4 and these levels correspond to the levels P00 and P10 of FIG. 2. In this case the main signal is modulated by a logic 0 of the fault location signal F2. When the switch 41 is in the other position, the current conveyed to the converter 5 will be equal to I(0) or I(0)+½[I(1)+I(2)] depending on the position of the switch 40. So this current now moves between the levels 0 and 1 of FIG. 4 and these levels correspond to the levels P0 and P1 of FIG. 2. In this case the main signal is modulated by a logic 1 of the fault location signal F2. In both cases the mean value of the current flowing through the laser diode 5 is equal to I(0)+½I(1)+I(2) and is consequently independent of the logic value of the low-frequency fault location signal F2. This means that the power dissipated in the converter 5 remains constant. Thus the amplitude modulation has no effect on the temperature of the converter 5 and consequently no wavelength modulation will occur.

Figure 5:
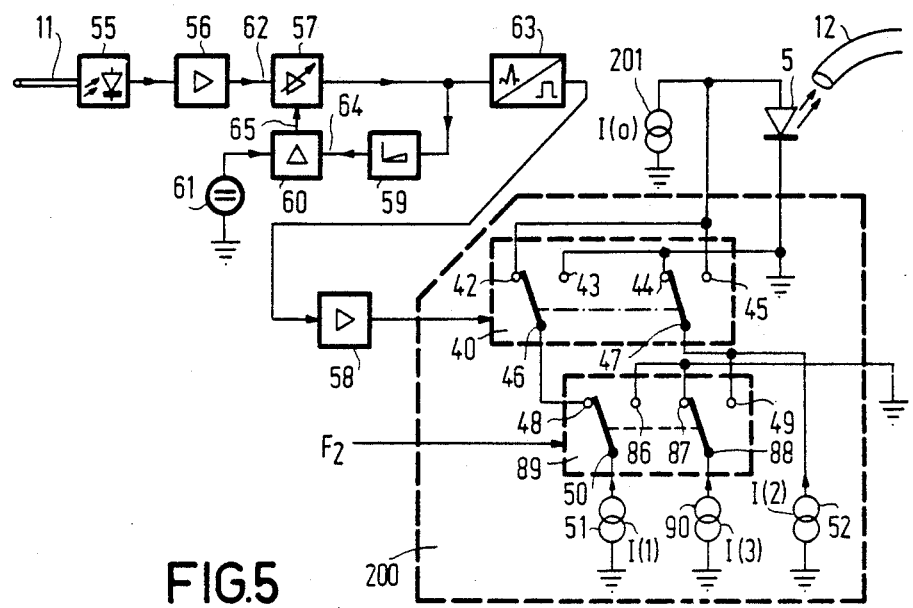
FIG. 5 shows an alternative embodiment of a full-wave amplitude modulator for use in the arrangement of FIG. 1.

FIG. 5 shows an embodiment in which the high and low levels of the optical signal do not occur equally often. The two pole switch 89 is operated by the fault location signal F2. The contact 48 of the two pole switch 89 is connected to the first pole 46 of the two pole switch 40. The contact 49 of the two pole switch 89 is connected to the second pole 47 of the two pole switch 40. The contacts 86 and 87 of the two pole switch 89 are connected to a point of constant potential. The first pole 50 of the two pole switch 89 is connected to a point of constant potential via the current source 51, while the second pole 88 of the two pole switch 89 is connected to the point of constant potential via a current source 90. The other components are identical to those shown in the embodiment of FIG. 3. When the dual switch 89 is in the position shown, a current equal to I(1)+I(0) or I(2)+I(0), depending on the position of the two pole switch 40, will flow to the converter 5. In this case the main signal is modulated by, for example, a logic 0 of the fault location signal. The average power dissipated in the converter 5 is then $$Po = \{p(h) \cdot (I(2) + I(0)) + p(1)(I(1) + I(0))\} \cdot V_d = \{p(h) \cdot I(2) + p(1) \cdot I(1) + I(0)\}V_d \tag{7}$$

wherein p(h) is the probability of occurrence of the optical high level, p(l) is the probability of the occurrence of the optical low level of the main signal, and $V_d$ is the fixed diode voltage.

If the two pole switch 89 is in the other position, a current equal to I(0) or I(2)+I(3)+I(0), depending on the position of the two pole switch 40, will flow to the converter 5. In this case the main signal is modulated by, for example, a logic 1 of the fault location signal. The average power dissipated in the converter 5 then is $$Po = \{p(h)(I(2) + I(3) + I(0)) + p(1) \cdot I(0)\} \cdot V_d \tag{8}$$
$$= \{p(h)(I(2) + I(3)) + I(0)\} \cdot V_d$$

If it is assumed that the relation $$I(1) = \frac{p(h)}{p(l)} \cdot I(3) \tag{9}$$

holds, then the dissipated powers, as shown in the relations (7) and (8), become equal and no wavelength modulation occurs, in spite of the fact that the fault location information is superimposed on the digital main signal as amplitude modulation.

Figure 6:
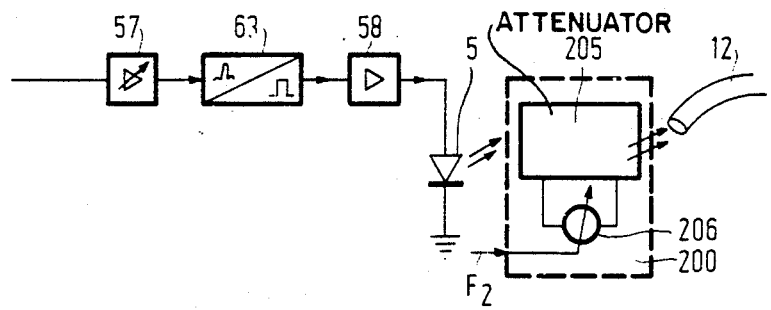
FIG. 6 shows a further alternative embodiment of a full-wave amplitude modulator for use in the arrangement of FIG. 1.

In the embodiment of FIG. 6 a different modulation method is shown. In contrast with the modulation method of FIG. 3, the light emitted by the converter 5 is now directly modulated. For this purpose this emitted light is passed through an electrically controllable attenuator, for example a liquid crystal attenuator. An example of such an attenuator is described in Electronics Letters, Mar. 1st, 1979, Vol. 15, No. 5, pages 146-147 (New Automatic Gain Control System, for Optical Receivers—Eve, Smith).

Such a liquid crystal attenuator has the property that its optical attenuation depends on the applied control voltage. This means that the optical signal which is radiated into the further transmission optical fibre 12 is modulated by the voltage supplied by the fault location source 206. As in this method the current flowing through the converter 5 is not amplitude-modulated, the average current flowing through the converter 5 will remain constant. So also here no wavelength modulation will occur.

Figure 7:
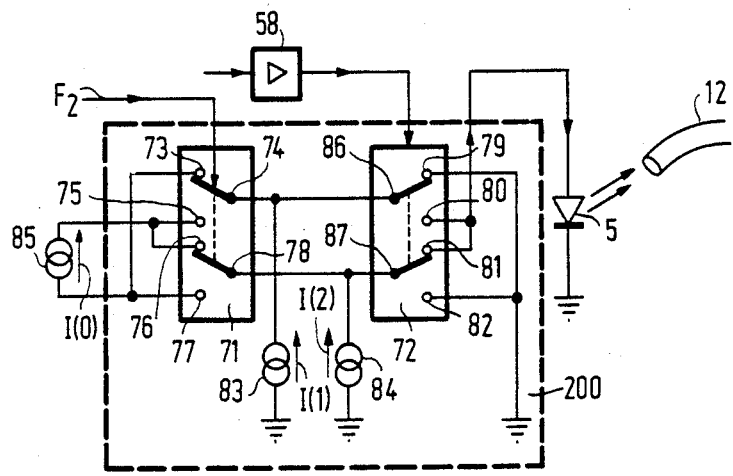
FIG. 7 shows a fourth embodiment of a full-wave modulator for use in the arrangement of FIG. 1.
Figure 8:
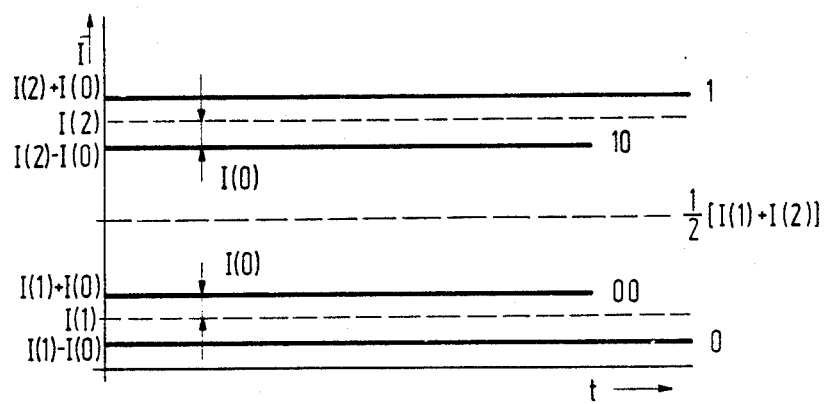
FIG. 8 shows a waveform diagram to explain the operation of the embodiment shown in FIG. 7.

In the embodiment of FIG. 7 a second example of amplitude modulation of the main signal is shown. The modulator 200 comprises two two pole two-position switches 71 and 72. These switches may be constructed in known manner, for example with switching transistors. The first contacts 80 and 81 of the switch 72 are connected to the light source 5 and the second contacts 79 and 82 are connected to a point of constant potential. The first contacts 75 and 76 of the switch 71 are connected to one terminal of a current source 85 while the second contacts 73 and 77 are connected to the other terminal of the current source 85. The poles 74 and 86 of the respective switches 71 and 72 are connected to a point of constant potential via the current source 83 while the poles 78 and 87 are connected to a point of constant potential via the current source 84. The two pole switch 72 is operated by the main signal supplied by the amplifier 58, so that the switch 72 is, for example, in the position shown when the main signal has the level high. The two pole switch 71 is operated by the fault location signal F2. When the switch 71 is in the position shown a current equal to I(2)+I(0) or I(1)−I(0), depending on the position of the switch 72 will flow to the converter 5. So the current through the converter 5 moves between the levels 1 and 0 of FIG. 8 and these levels correspond to the levels P1 and P0 of FIG. 2. In this case the main signal is modulated by a logic 1 of the fault location signal F2. When the switch 71 is in the other position, the current which flows between the converter 5 will be equal to I(2)−I(0) or I(1)+I(0). So the current through the converter 5 moves between the levels 10 and 00 of FIG. 8 and these levels correspond to the levels P10 and P00 of FIG. 2. In this case the main signal is modulated by a logic 0 of the fault location signal F2. In both cases the mean value of the current, flowing through the converter 5 is equal to ½(I(1)+I(2)) and consequently independent of logic value of the low-frequency fault location signal F2. This means that the power dissipated in the converter 5 remains equal. So the amplitude modulation has no effects on the temperature of the converter 5 and consequently no wavelength modulation will occur.

What is claimed is

1. In a digital optical transmission system having two terminal stations connected by a series of repeaters in one or both transmission directions, each repeater having an electro-optical converter connected to an ongoing optical transmission path, a fault location system for transmitting by amplitude modulation a fault location signal comprising:

an amplitude modulator at each repeater for generating two amplitude levels in response to said fault location signal for both of the two logic levels carried by the digital optical transmission system, whereby a four-level signal is transmitted over said transmission system which maintains power dissipation of said electro-optical converter substantially constant, avoiding wavelength modulation of the light signal carried by said transmission system.

2. In a digital optical transmission system having two terminal stations connected by a series of repeaters in one or both transmission directions, each repeater having an electro-optical converter connected to an ongoing optical transmission path, a fault location system for transmitting by amplitude modulation a fault location signal comprising:

an amplitude modulator at each repeater for generating two amplitude levels for both of the two logic levels carried by the digital optical transmission system comprising:

(a) a two pole two position switch, having a position selectable in accordance with the level of a received optical transmission signal in said optical transmission path; said two pole switch having a first pair of contacts connected to opposite terminals of said electro-optical converter, and a second pair of contacts connected to said terminals of said electro-optical converter reverse to said first pair of contacts;

(b) a single pole two position switch connected to be positioned by a fault location signal, the pole of the single pole switch connected to receive a constant potential through a current source; first and second contacts of said single pole switch connected to first and second poles of the two pole switch, said first contact additionally connected to receive a constant potential through a current source;

whereby a four level signal is produced by said electro-optical converter in response to said fault location signal.

3. In an optical transmission system having two terminal stations connected by a series of repeaters in one or both transmission directions, each repeater having an electro-optical converter connected to an ongoing optical transmission path, a fault location system for transmitting by amplitude modulation a fault location signal comprising:

an amplitude modulator at each repeater for generating two amplitude levels for both of the two logic levels carried by the digital optical transmission system comprising:

a first two pole two position switch having a position selectable in response to the logic level on said transmission path, a first and second pair of contacts connected across said electro-optical converter in opposition to each other; and, a second two pole two position switch having a position selectable in response to the amplitude level of a fault location signal, and having a first pole connected to a source of voltage potential through a current source, and a second pole connected to a source of potential through a current source, a first contact of one pair of contacts connectable to one pole of said first two pole two position switch, a first contact of the remaining pair of contacts connectable to the remaining pole of said first two pole two position switch and to a potential through a current source, the remaining contacts of said pairs of contacts connected to a common potential.

4. In a digital optical transmission system having two terminal stations connected by a series of repeaters in one or both transmission directions, each repeater having an electro-optical converter connected to an ongoing optical transmission path, a fault location system for transmitting by amplitude modulation a fault location signal comprising:

an electrically controllable attenuator positioned between the electro-optical converter and the ongoing transmission path and having an input for receiving a fault location signal, said attenuator generating two amplitude levels for both of the two logic levels of the digital optical transmission signal, and two additional levels in response to said fault location signal.

5. In a digital optical transmission system having two terminal stations connected by a series of repeaters in one or both transmission directions, each repeater having an electro-optical converter connected to an ongoing optical transmission path, a fault location system for transmitting by amplitude modulation a fault location signal comprising:

an amplitude modulator at each repeater for generating two amplitude levels for both of the two logic levels carried by the digital optical transmission system comprising:

a first two pole two position switch having first and second pairs of contacts, opposite contacts of said pairs connected together, and connected across said electro-optical converter, said switch position selectable in response to a logic level on said ongoing optical transmission path;

a second two pole two position switch having a position being selected in response to a fault location signal, a first current source connected across opposite contacts of each of a third and fourth pair of contacts, and first and second poles connected to respective first and second poles of said first two pole switch, and to a source of common potential through respective second and third current sources.

* * * * *